(12) United States Patent
Grimes et al.

(10) Patent No.: US 7,443,766 B2
(45) Date of Patent: Oct. 28, 2008

(54) SENSOR ASSEMBLY

(75) Inventors: Harvey Ray Grimes, Slependen (NO); Francis Maissant, Oslo (NO)

(73) Assignee: WesternGeco L.L.C., Houston, TX (US)

( * ) Notice: Subject to any disclaimer, the term of this patent is extended or adjusted under 35 U.S.C. 154(b) by 0 days.

(21) Appl. No.: 11/535,814

(22) Filed: Sep. 27, 2006

(65) Prior Publication Data
US 2008/0074949 A1     Mar. 27, 2008

(51) Int. Cl.
*G01V 1/16* (2006.01)
(52) U.S. Cl. .................. 367/188; 367/178; 367/182; 367/185; 73/649
(58) Field of Classification Search .......... 367/178, 367/182, 185, 188; 73/649
See application file for complete search history.

(56) References Cited

U.S. PATENT DOCUMENTS

| | | | | |
|---|---|---|---|---|
| 2,271,864 A | * | 2/1942 | Honnell et al. | 367/182 |
| 3,610,973 A | * | 10/1971 | Bauer et al. | 367/183 |
| 3,911,388 A | * | 10/1975 | Crump et al. | 367/188 |
| 3,924,261 A | * | 12/1975 | Kardashian | 367/182 |
| 4,479,389 A | * | 10/1984 | Anderson et al. | 73/651 |
| 5,161,414 A | * | 11/1992 | Rubbelke | 73/658 |

OTHER PUBLICATIONS

Mu-Metal Information From Answers.

* cited by examiner

*Primary Examiner*—Ian J Lobo
(74) *Attorney, Agent, or Firm*—Fred G. Pruner, Jr.; Liangang (Mark) Ye; Jeffrey E. Griffin

(57) ABSTRACT

A sensor assembly includes a seismic sensor element and a shell. The shell at least partially surrounds the sensor element to shield the sensor element from a magnetic field that is generated outside of the shell.

28 Claims, 4 Drawing Sheets

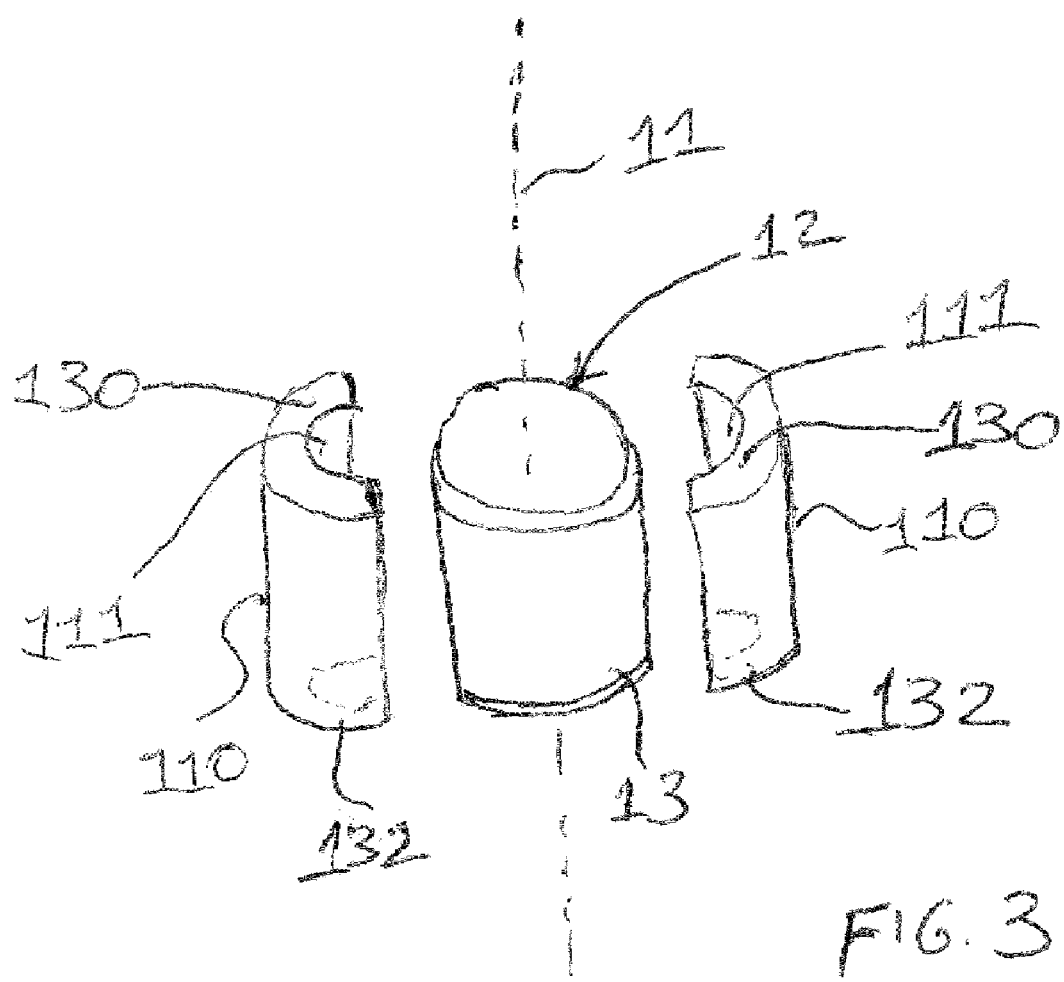

SENSOR ASSEMBLY

BACKGROUND

The invention generally relates to a sensor assembly.

Seismic surveying may be used for purposes of obtaining characteristics and attributes of an oil or gas reservoir. For a land-based seismic survey, a seismic source produces acoustic waves, which travel downwardly into the earth and are reflected back to a number of seismic sensors, called geophones. The geophones produce signals, which indicate the detected seismic waves, and the signals from the geophones may be recorded and processed to yield information about the nature of the earth below the area being investigated.

One type of geophone, called a single coil geophone, includes a single coil of wire that is suspended in an internal magnetic field (a field formed from one or more permanent magnets within the geophone, for example). Movement of the coil relative to the internal magnetic field due to a seismic wave results in cutting lines of magnetic flux, an event that produces a corresponding output voltage (across the coil) that indicates the seismic wave.

The single coil of the single coil geophone has a relatively small mass, which makes it relatively easy to control. However, a conventional single coil geophone may be relatively sensitive to magnetic fields that are produced by sources that are external to the geophone, such as overhead electrical power transmission lines, electrical power lines associated with an electric railroad and an underground pipeline protection system. More specifically, external magnetic fields may cause unintended movement of the geophone's coil, which may impart a significant noise component to the geophone's output voltage. Another type of geophone (called a dual coil geophone) has a second coil in a design that ideally diminishes the effects of external magnetic fields at the price of increasing the weight of the coil form. A microelectromechanical (MEM)-based geophone may also be relatively insensitive to external magnetic fields, as this geophone typically does not contain any explicit inductive-type elements (such as a coil), which are affected by an external magnetic field. However, both dual coil and MEM-based geophones typically are considerably more expensive than their single coil counterpart, and the dual coil geophone's higher coil mass is more difficult to control if used as part of a feedback circuit.

SUMMARY

In an embodiment of the invention, a sensor assembly includes a seismic sensor element and a shell. The shell at least partially surrounds the sensor element to shield the sensor element from a magnetic field that is generated outside of the shell.

In another embodiment of the invention, a technique includes at least partially surrounding a seismic sensor element with a shell to shield the sensor element from a magnetic field that is generated outside of the shell.

In yet another embodiment of the invention, a system includes a seismic acquisition subsystem and a sensor assembly that is electrically coupled to the seismic acquisition system. The sensor assembly provides a signal that is indicative of a seismic wave to the seismic acquisition system. The sensor assembly includes a geophone element and a shell. The shell at least partially surrounds the geophone element to shield the element from a magnetic field that is generated outside of the shell.

Advantages and other features of the invention will become apparent from the following drawing, description and claims.

BRIEF DESCRIPTION OF THE DRAWING

FIG. 3 is an exploded perspective view of a selection portion of a seismic sensor assembly illustrating an alternative spacer according to an embodiment of the invention.

DETAILED DESCRIPTION

Figure 1:
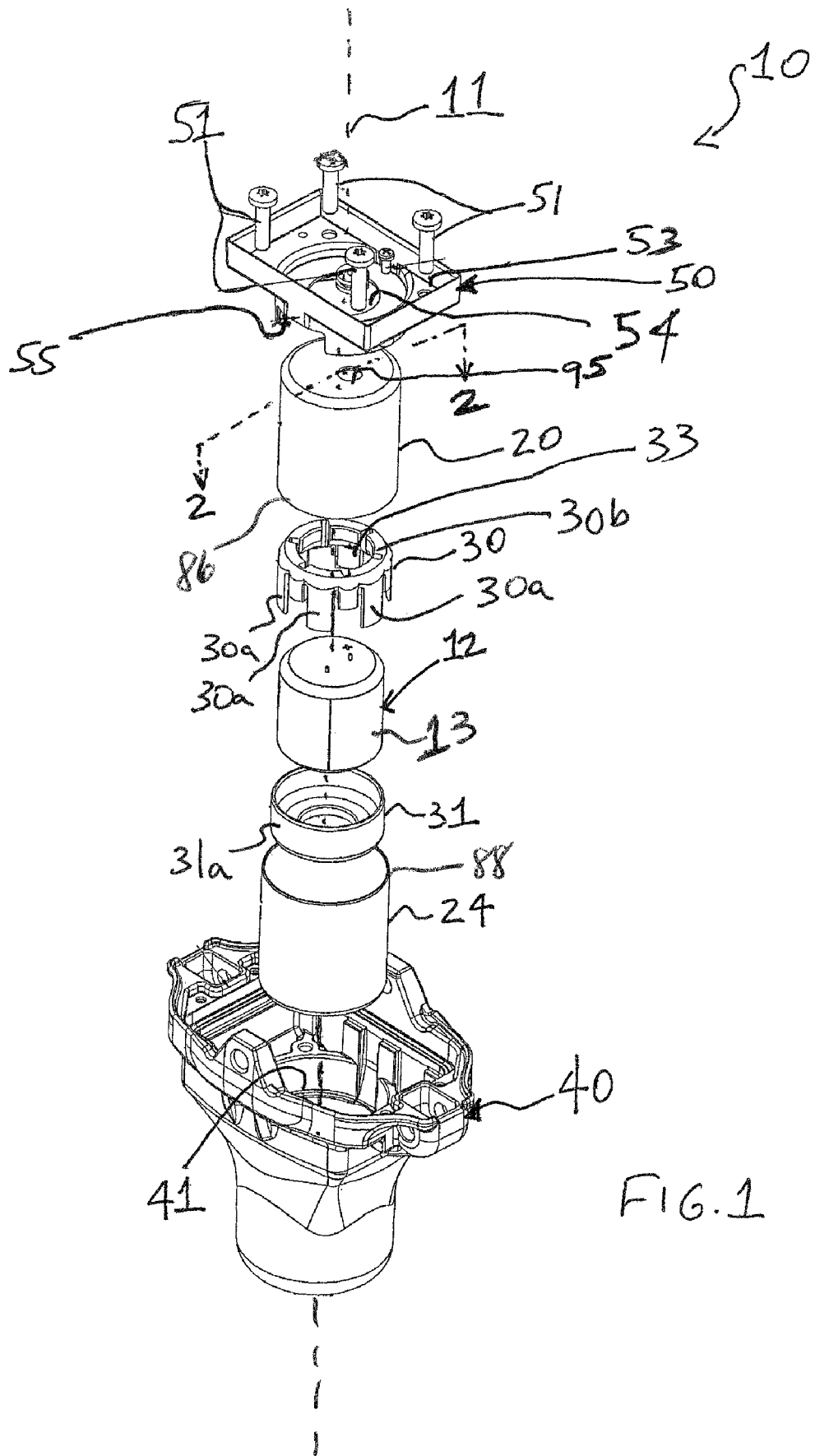
FIG. 1 is an exploded perspective view of a seismic sensor assembly according to an embodiment of the invention.

Referring to FIG. 1, a seismic sensor assembly 10 in accordance with an embodiment of the invention includes a shell (described further below) to shield a seismic sensor element 12 of the assembly 10 from a magnetic field (herein called an "external magnetic field") that is generated by a source that is external to the element 12, such as overhead electrical power transmission lines, electrical lines associated with an electric railroad or an underground pipeline protection system, as just a few examples. Due to the magnetic field shielding, the sensor element 12 may not need a design that accommodates external magnetic fields, thereby possibly leading to the use of a relatively lower cost sensor element (in accordance with some embodiments of the invention). In the context of this application, "shielding" of the sensor element 12 from an external magnetic field refers to reducing the magnitude of the portion of the external magnetic field, which would affect the sensor element 12, if not for the shielding.

In accordance with some embodiments of the invention, the sensor element 12 may be a single coil geophone, which includes a housing 13 that encloses a single coil (not shown) and one or more internal magnets (not shown) of the element 12. The internal magnet(s) establish an internal magnetic field for the sensor element 12, and the coil is suspended in the internal magnetic field so that movement of the coil relative to the internal magnetic field (due to a seismic wave) forms a corresponding voltage across the coil (and thus, across the output terminals) of the element 12. Due to the magnetic field shielding that is provided by the shell, the noise that may otherwise be produced by external magnetic fields is significantly reduced, thereby improving the signal-to-noise (S/N) ratio of the sensor element 12, as compared to conventional single coil geophones. Furthermore, in accordance with some embodiments of the invention, the sensor element 12 may be a single coil geophone, which due to the magnetic field shielding, has a comparable S/N performance to typically more expensive dual coil geophone sensors.

The single coil geophone is merely an example of one out of many possible embodiments of the sensor element 12. For example, in other embodiments of the invention, the sensor element 12 may be a dual coil geophone, as the magnetic shielding that is disclosed herein enhances the geophone's performance to bring it to a performance level competitive with the more expensive MEM-based element.

The sensor element 12 is not limited to geophones, however, as non-geophone sensors may be used in other embodiments of the invention. In general, the sensor element 12 may be any sensor, which benefits from the magnetic shielding that is provided by the sensor assembly 10.

Turning now to the more specific details of a particular embodiment of the invention, the magnetic field shielding may be provided by a shell that is constructed of a material that concentrates magnetic flux lines (relative to free air), such as an iron-containing, or ferrous, material. As a more specific example, in accordance with some embodiments of the invention, the shell may be formed from Mumetal, such as Mil-N-14411C Composition 3. Alternatively, the Mumetal may be SP 510, which is available from Imphy Alloys, which is a subdivision of Groupe Arcelor. SP 510 has the following composition: Ni=50%, Mn=0.5%, Si=0.2%, C=0.01%, Cr=10%, and Fe for the remaining balance.

According to some embodiments of the invention, the shell may be assembled from multiple pieces that are constructed to fit together to at least partially enclose the sensor element 12. More specifically, in accordance with some embodiments of the invention, the shell may be formed from upper 20 and lower 24 half shells, or thimbles, which fit together to form a complete enclosure for the sensor element 12. As depicted in FIG. 1, each of the upper 20 and lower 24 thimbles is generally concentric with respect to the sensor element 12 and a longitudinal axis 11 of the sensor assembly 10; and the sensor element 12 is positioned between the upper 20 and lower 24 thimbles. More particularly, for the orientation of the sensor assembly that is depicted in FIG. 1, the upper thimble 20 is cup-shaped with its opening facing downwardly, and the lower thimble 24 is cup-shaped with its opening facing upwardly.

In some embodiments the upper 20 and lower 24 thimbles may be identical. However, in other embodiments of the invention, such as the one depicted in FIG. 1, the lower thimble 24, in general, has a larger radius about the longitudinal axis 11 than the upper thimble 20. Due to its larger diameter, the lower thimble 24 is designed to receive both the sensor element 12 and the upper thimble 20 (which fits over the sensor element 12, as described below) when the sensor assembly 10 is assembled. Although this relationship facilitates assembly in that the sensor element 12 and the upper thimble 20 may be dropped into the lower thimble 24, the upper thimble 20 may, in other embodiments of the invention have a larger radius about the longitudinal axis 11 than the lower thimble 24, as many variations are possible and are within the scope of the appended claims.

Regardless of their specific geometries, in general, the upper 20 and lower 24 thimbles are constructed to fit together to collectively form a shell 98 (see also FIG. 2) that at least partially encloses the sensor element 12. For embodiments of the invention, which are described herein, the shell 98 completely encloses, or encapsulates, the sensor element 12. Because the thimbles 20 and 24 are formed from a ferrous material (a material such as Mumetal, for example), the magnetic flux lines from any surrounding external magnetic field are concentrated in the shell 98 to completely block or significantly reduce the magnitude of the external magnetic field, which would otherwise extend to the inner components of the sensor element 12.

Due to the internal magnet(s) of the sensor element 12 (in accordance with some embodiments of the invention), the upper 20 and lower 24 thimbles may become magnetically saturated (thereby reducing the shell's shielding ability) if the sensor element 12 contacts or is in close proximity to the thimbles 20 and 24. Therefore, in accordance with some embodiments of the invention, the sensor assembly 10 includes at least one spacer, for purposes of establishing a controlled and uniform offset between the sensor element 12 and the surrounding upper 20 and lower 24 thimbles. Unlike the upper 20 and lower 24 thimbles, the spacer(s) are formed from a non ferrous material that behaves more like free air and does not concentrate magnetic flux lines.

As depicted in FIG. 1, in accordance with some embodiments of the invention, the sensor assembly 10 may include two spacers that are formed from upper 30 and lower 31 caps that engage the upper and lower ends, respectfully, of the sensor element 12. For example, in accordance with some embodiments of the invention, the upper 30 and lower 31 caps each form a friction fit with the respective ends of the sensor element 12.

The upper cap 30 provides an offset between the upper end of the sensor element housing 13 and the inner surface of the top end of the upper thimble 20; and the lower cap 31 provides an offset between the lower end of the sensor element housing 13 and the inner surface of the bottom end of the lower thimble 24. The upper 30 and lower 31 caps also establish a standoff distance between the longitudinal walls of the sensor element housing 13 and the longitudinal walls of the upper 20 and lower 24 thimbles. More specifically, in accordance with some embodiments of the invention, the upper cap 30 may include fingers 30a that longitudinally extend downwardly from a ring 30b. The ring 30b includes an opening 33 that provides a pathway for electrical wires to extend from the sensor element 12. The cap 31 may include a sidewall 31a that extends around a lower sidewall portion of the sensor element 12.

When the sensor assembly 10 is assembled, the caps 30 and 31 and the sensor element 12 form a unit that is disposed inside the surrounding shell that is formed from the upper 20 and lower 24 thimbles. In accordance with any embodiments of the invention, the caps 30 and 31 are formed from a non-ferrous metal.

Figure 2:
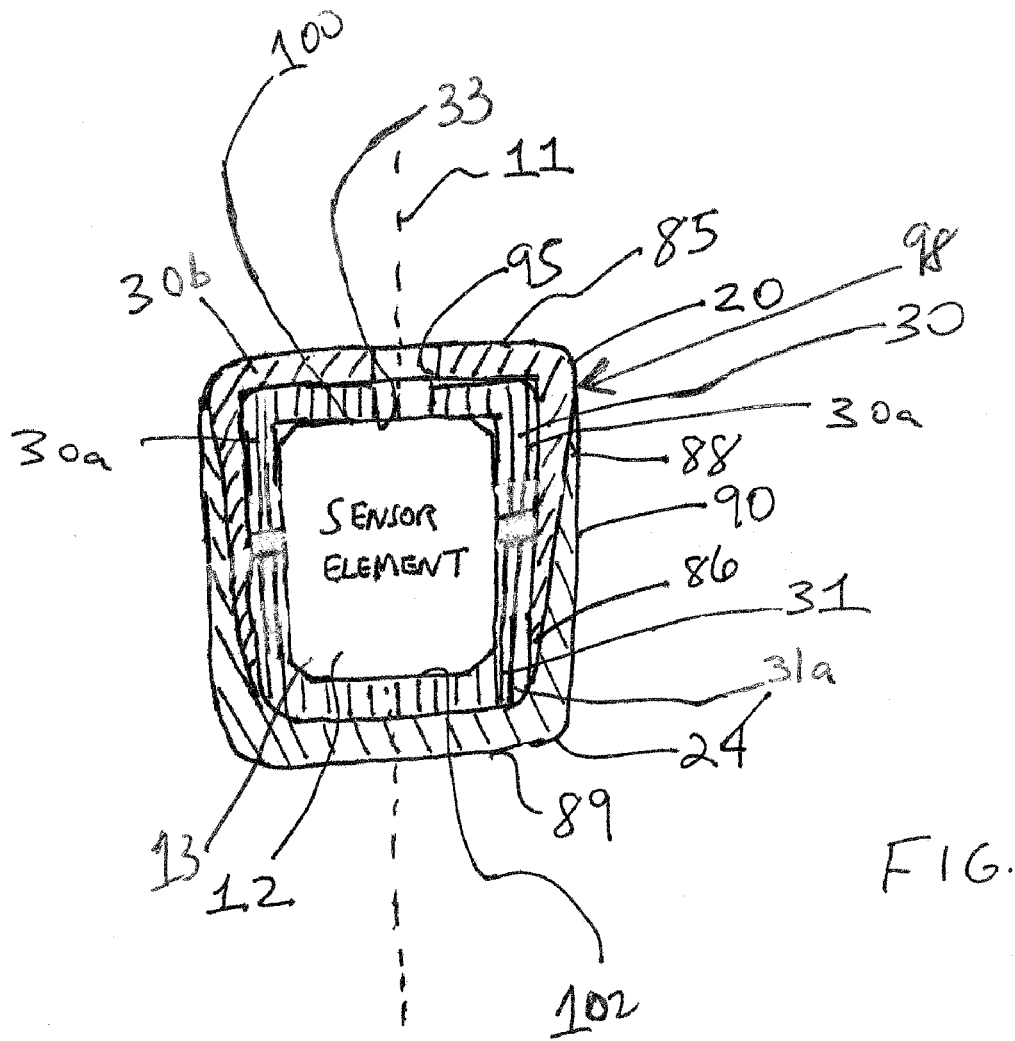
FIG. 2 is a cross-sectional view of a selected portion of the sensor assembly taken along line 2-2 of FIG. 1 according to an embodiment of the invention.

Among the other features of the sensor assembly 10, in accordance with some embodiments of the invention, the sensor assembly 10 includes a lower housing 40, which includes a pocket 41 to receive the assembled shell 98 (see FIG. 2). The shell 98 is held in place inside the pocket 41 by a plate assembly 50, which may be connected to the housing 40 via screws 51 (for example), in accordance with some embodiments of the invention.

The plate assembly 50 may also form an electromagnetic shield for the sensor assembly 10. The plate is to shield from electrical interference. Because it is non ferrous, it has no effect on magnetic interference. In this regard, in accordance with some embodiments of the invention, the plate assembly 50 may be formed from an electrically-conductive material to shield an electronics board (not shown) and possibly other components of the sensor assembly 10 from electromagnetic interface (EMI). The electronics board may be disposed inside an upper recess 53 of the plate assembly 50, and the plate assembly 50 may include an opening 54 for routing the electrical wires from the sensor element 12 to the electronics board.

Among its other features, the sensor assembly 10 may include a fluid seal (not shown) between the plate assembly 50, and the sensor assembly 10 may include an upper housing plate (not shown) that connects to the lower housing 40 to complete the overall housing for the assembly 10. The sensor assembly 10 may also include seals and external connectors for purposes of forming external electrical contacts for the electronics board.

FIG. 2 depicts a cross-section of the shell 98, along with the upper 20 and lower thimbles 24 and caps 30 and 31 that are disposed therein, in accordance with some embodiments of the invention. As shown, the upper 31 and lower 30 caps fit over respective ends 100 and 102 of the sensor element housing 13. The upper opening 33 of the upper cap 31 and an upper opening 95 (see also FIG. 1) of the upper thimble 24 collectively form a path for extending electrical wires (not depicted in the figures) from the sensor element 12 to the electronics board (not shown). As depicted in FIG. 2, the upper thimble 20, in accordance with some embodiments of the invention, is received by the lower thimble 24.

The thickness of each thimble 20, 24 is tapered along the longitudinal axis 11 of the sensor assembly 10 for purposes of forming a uniform wall thickness for the overall shell 98. More specifically, the lower thimble 24 has a larger wall thickness near its bottom end 89, and the wall thickness of the lower thimble 24 decreases with distance from the bottom end 89 along the longitudinal axis 11 so that the lower thimble 24 has a minimum thickness at its upper rim 88. In a similar manner, the wall thickness of the upper thimble 20 gradually decreases along the side of the thimble 20, the farther the sidewalls extend from the upper end 85 of the thimble 20. Thus, the upper thimble 20 has its maximum wall thickness at the upper end 85 and its minimum wall thickness at its lower rim 86. While there is some taper to facilitate mating, most of the uniformity may be achieved by doubling metal thickness of the two end plates which results in the endcaps being the same thickness as the walls that had their thickness doubled when the swallowed each other.

Due to the complimentary nature of the tapered wall thicknesses of the thimbles 20 and 24, the wall thickness of the shell 98 is substantially uniform. Thus, a thickness of the sidewall of the shell 98 at reference numeral 90 where the upper 20 and lower 24 thimbles overlap is approximately the same as the thickness of the shell 98 at the thimble ends 85 and 89, where the upper 20 and lower 24 thimbles do not overlap.

Other embodiments are within the scope of the appended claims. For example, referring to FIG. 3, in accordance with some embodiments of the invention, a single spacer may be used (in place of the upper 30 and lower 31 caps). In this regard, the spacer may be formed from two half-shells 110, each of which generally resembles a half cylinder that circumscribes one half of the longitudinal axis 11. The spacer shells 110, when assembled together, generally form a circular cylinder that engages the sidewalls of the sensor elements housing 13 for purposes of forming a single, unified body spacer to establish a controlled radial gap between the shell and the sensor element 12.

Each shell 110 may also have a partial upper radial extension 130 that extends over the top end of the sensor element housing 13 for purposes of establishing a standoff distance between the top end of the housing 13 and the upper inner surface of the upper thimble 20 (see also FIG. 1). Likewise, each shell 110 may have a partial lower radial extension 132 that extends over the bottom end of the sensor element housing 13 for purposes of establishing a controlled gap between the lower end of the housing 13 and the lower inner surface of the lower thimble 24. The shells 110 may be assembled together using a number of different mechanisms, such as screws or clamps (as examples only), depending on the particular embodiment of the invention. Additionally, as depicted in FIG. 3, in accordance with some embodiments of the invention, openings 111 may be provided at the upper ends of the shells 110 to provide a pathway for routing electrical wires from the sensor element 12 to the electronics board when the shells 110 are assembled together. Similar to the caps 30 and 31, the shells 110 may be formed from a material that does not concentrate magnetic flux lines, such as a non-ferrous metal.

Figure 4:
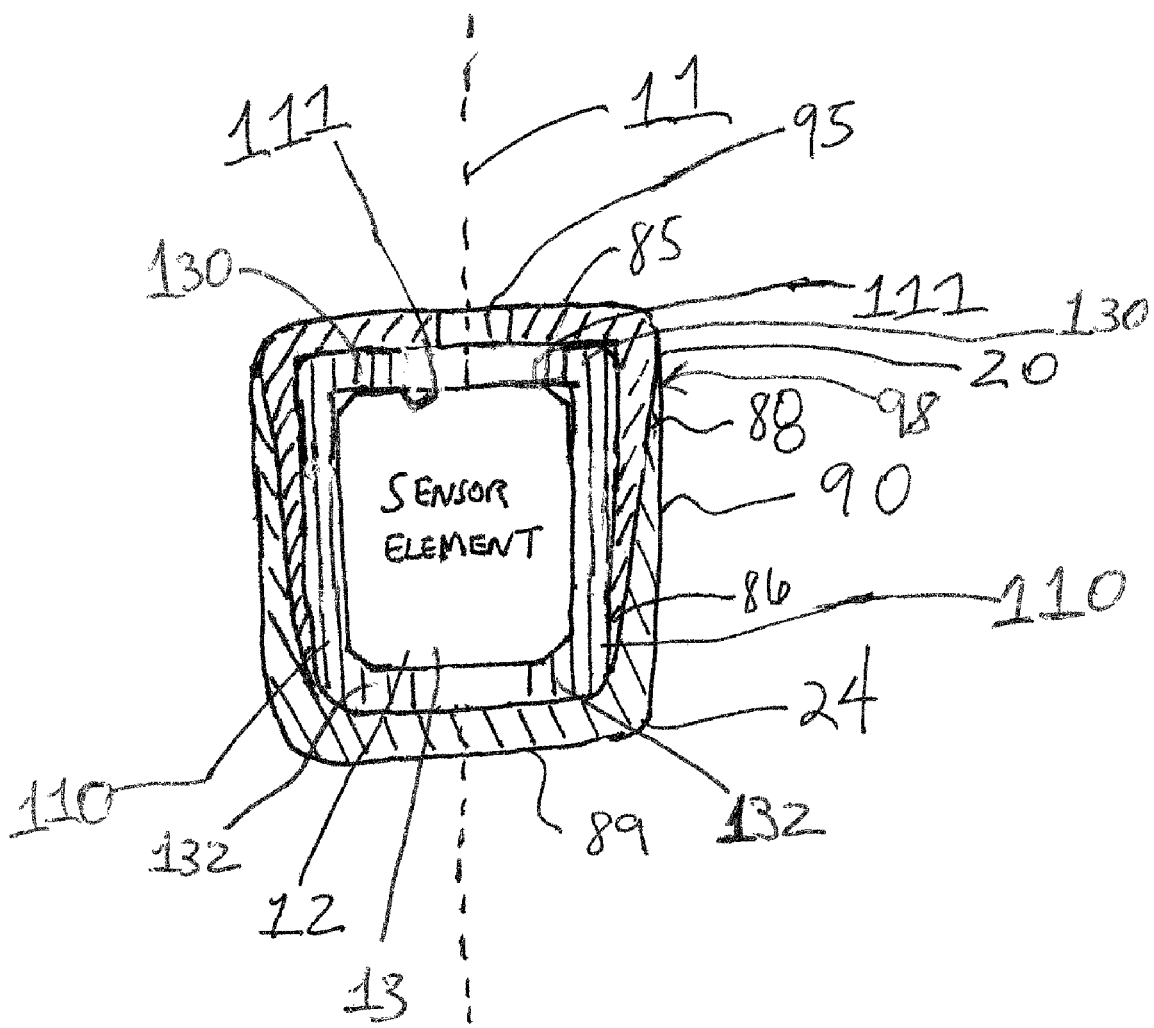
FIG. 4 is a cross-sectional view of a selected portion of a seismic sensor assembly illustrating use of the spacer of FIG. 3 according to an embodiment of the invention.

FIG. 4 depicts a cross-section (to be compared to the cross-section in FIG. 2) of a sensor assembly that includes a spacer that is formed from the two shells 110. As shown, when the sensor assembly is assembled, the spacer formed from the shells 110 establishes a uniform gap between the sensor element 12 and the inside of the surrounding shell 98.

Figure 5:
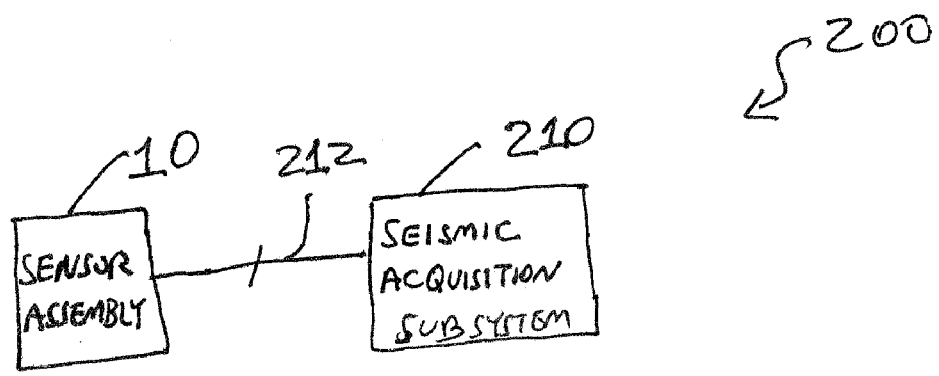
FIG. 5 is a schematic diagram of a system according to an embodiment of the invention.

The sensor assemblies that are disclosed herein, such as the sensor assembly 10, may be used in a wide range of applications, one of which is depicted in FIG. 5. Referring to FIG. 5, the sensor assembly 10 may be electrically coupled (via electrical wires 212) to a seismic acquisition subsystem 210. As an example, the seismic acquisition subsystem 210 may be a computer-based system that produces an acoustic wave and processes signals that are provided by the sensor assembly 10 in response to the acoustic wave for purposes of developing a seismic survey. The seismic acquisition subsystem 210 may be coupled to many other sensor assemblies 10 (not depicted in FIG. 5), depending on such parameters as the desired measurement resolution and the area of investigation, in accordance with embodiments of the invention.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A sensor assembly, comprising:
   a seismic sensor element enclosed in a housing;
   a first shell separate from the housing and having a first opening to receive part of the housing, the first shell being formed from a material that concentrates magnetic flux lines relative to free air;
   a second shell separate from the housing and having a second opening to receive another part of the housing, the second shell being formed from a material that concentrates magnetic flux lines relative to free air,
   wherein the first and second shells are adapted to mate such that the first shell closes off the second opening and the second shell closes off the first opening to form an enclosed shell that surrounds the sensor element to shield the sensor element from a magnetic field that is generated outside of the enclosed shell.

2. The sensor assembly of claim 1, wherein the enclosed shell is adapted to attenuate a strength of the magnetic field so that a magnetic field present inside the enclosed shell and produced by the external magnetic field has a strength that is significantly less than the strength of the external magnetic field.

3. The sensor assembly of claim 1, further comprising:
   a spacer located between the enclosed shell and the sensor element.

4. The sensor assembly of claim 3, wherein the spacer comprises a nonferrous material.

5. The sensor assembly of claim 3, wherein the sensor comprises an inductive element, and the spacer is adapted to establish gap between the enclosed shell and the housing to prevent the enclosed shell from being saturated by at least one the internal magnet of the sensor.

6. The sensor assembly of claim 1, wherein sensor element comprises a geophone element.

7. The sensor assembly of claim 6, wherein the sensor element comprises a magnet and a coil electrically sensitive to movement of the coil with respect to the magnet.

8. The sensor assembly of claim 6, wherein the sensor element comprises a microelectromechanical device.

9. The sensor assembly of claim 1, wherein the enclosed shell comprises Mumetal.

10. The sensor assembly of claim 1, wherein the first and second shells are adapted to fit together to collectively completely surround the sensor element.

11. The sensor assembly of claim 1, wherein one of the first and second shells is sized to receive the other one of the first and second shells.

12. The sensor assembly of claim 1, wherein the first and second shells partially overlap when fitted together, and a thickness of each of the first and second shells is profiled so that a wall collectively formed from the first and second shells where the first and second shells overlap has approximately the saint thickness as portions of the first and second shells where the first and second shells do not overlap.

13. The sensor assembly of claim 1, further comprising:
a shield to attenuate an electric field that is generated outside of the sensor element.

14. The sensor assembly of claim 13, wherein the shield comprises an electrically conductive material.

15. A method comprising:
partially disposing an enclosed seismic sensor element in a first shell separate from the seismic sensor element;
partially disposing the enclosed seismic sensor element in a second shell separate from the seismic sensor element;
combining the first and second shells together to form an enclosed shell such that the first shell closes off an opening of the second shell and the second shell closes off an opening of the first shell; and
using the enclosed shell to shield the sensor element from a magnetic field that is generated outside of the enclosed shell.

16. The method of claim 15, further comprising:
using the enclosed shell to attenuate a strength of the magnetic field so that a magnetic field present inside the enclosed shell and produced by the external magnetic field has a strength that is significantly less than the strength of the external magnetic field.

17. The method of claim 15, wherein the enclosed shell comprises Mumetal.

18. The method of claim 15, wherein the first and second shells when combined form an enclosure that completely surrounds the sensor element.

19. The method of claim 16, wherein the act of combining comprises receiving one of the first and second shells in the other of the first and second shells to form the enclosed shell.

20. The method of claim 19, wherein the first and second shells partially overlap when one of the first and second shells is received into the other of the first and second shells, the method further comprising:
profiling a thickness of each of the first and second shells is profiled so that a wall collectively formed from the first and second shells where the first and second shells overlap has approximately the same thickness as portions of the first and second shells where the first and second shells do not overlap.

21. A system comprising:
a seismic acquisition subsystem; and
a sensor assembly electrically coupled to the seismic acquisition system to provide a signal indicative of seismic activity to the seismic acquisition system, the sensor assembly comprising:
a geophone element enclosed in a housing;
a first half shell separate from the housing to receive part of the housing and being formed from a material that concentrates magnetic flux lines relative to free air; and
a second half shell separate from the housing to receive another part of the housing and being formed from a material that concentrates magnetic flux lines relative to free air,
wherein the first and second half shells are adapted to mate to form an enclosed shell that surrounds the geophone element to shield the geophone element from a magnetic field that is generated outside of the enclosed shell.

22. The system of claim 21, further comprising:
at least one nonferrous spacer located between the housing and the enclosed shell.

23. The system of claim 22, wherein said at least one nonferrous spacer comprises a first spacer to mate with a first end of the geophone element and a second spacer to mate with a second end of the geophone element.

24. The system of claim 21, wherein the geophone element comprises a magnet and a coil electrically sensitive to movement of the coil with respect to the magnet.

25. The system of claim 21, wherein the geophone element comprises a microelectromechanical device.

26. The system of claim 21, wherein the enclosed shell comprises Mumetal.

27. The system of claim 21, wherein one of the first and second shells is adapted to receive the other first and second shells.

28. The system of claim 21, further comprising:
a shield to attenuate an electric field that is generated outside of the geophone element.

* * * * *